United States Patent
De Wilde

(10) Patent No.: US 9,377,042 B2
(45) Date of Patent: Jun. 28, 2016

(54) MODULAR CONSTRUCTION SYSTEM, CONSTRUCTION ELEMENT, COUPLING ELEMENT, END ELEMENT AND TOOL FOR USE IN SUCH A CONSTRUCTION SYSTEM

(75) Inventor: Gerrit Jan De Wilde, Anerveen (NL)

(73) Assignee: Widee B.V., Lutten (NL)

( * ) Notice: Subject to any disclaimer, the term of this patent is extended or adjusted under 35 U.S.C. 154(b) by 377 days.

(21) Appl. No.: 13/813,052

(22) PCT Filed: Jul. 28, 2011

(86) PCT No.: PCT/NL2011/050544
§ 371 (c)(1),
(2), (4) Date: Apr. 11, 2013

(87) PCT Pub. No.: WO2012/015304
PCT Pub. Date: Feb. 2, 2012

(65) Prior Publication Data
US 2013/0195547 A1 Aug. 1, 2013

(30) Foreign Application Priority Data

Jul. 30, 2010 (NL) ..................................... 2005185
Jul. 30, 2010 (NL) ..................................... 2005186

(51) Int. Cl.
*E04B 1/19* (2006.01)
*F16B 12/26* (2006.01)
(Continued)

(52) U.S. Cl.
CPC .............. *F16B 12/26* (2013.01); *A63H 33/062* (2013.01); *A63H 33/08* (2013.01); *A63H 33/101* (2013.01); *Y10T 403/342* (2015.01); *Y10T 403/608* (2015.01)

(58) Field of Classification Search
CPC ... A63H 33/062; A63H 33/08; A63H 33/101; F16B 12/26; Y10T 403/342

USPC ................. 446/111, 113, 120, 121, 122, 124; 52/285.1, 285.4, 286
See application file for complete search history.

(56) References Cited

U.S. PATENT DOCUMENTS 2,885,822 A 5/1959 Onanian
3,123,020 A * 3/1964 Voissem ........................ 108/56.1
(Continued)

FOREIGN PATENT DOCUMENTS

CN 1911483 A 2/2007
CN 101272835 A 9/2008
(Continued)

OTHER PUBLICATIONS

International Search Report for PCT Patent Application No. PCT/NL2011/050544, filed on Jul. 28, 2011 dated Nov. 23, 2011, 5 pages.
(Continued)

*Primary Examiner* — Daniel P Stodola
*Assistant Examiner* — Matthew R McMahon
(74) *Attorney, Agent, or Firm* — Hovey Williams LLP

(57) ABSTRACT

The invention relates to a modular construction system, comprising at least two construction elements (20) and a coupling element (1), wherein: the coupling element (1) comprises a body (2) with two surfaces which are each provided with coupling means, wherein the coupling means of at least one surface comprise a ring of resiliently pivotable lips (4) provided with locking protrusions; at least one of the two construction elements comprises an opening (22) for receiving the lips of the coupling element; the lips are adapted to displace inward in order to release the connection between the coupling element and the construction element; and the plate-like body of the coupling element comprises an opening (6) which is provided with resiliently pivotable tongues (7) extending radially inward which are connected to the lips (4), wherein the tongues are displaced out of the plane of the plate-like body by a force being exerted thereon, such that due to displacement of the tongues the lips are displaced inward.

8 Claims, 16 Drawing Sheets

(51) Int. Cl.
  *A63H 33/06* (2006.01)
  *A63H 33/08* (2006.01)
  *A63H 33/10* (2006.01)

(56) References Cited

U.S. PATENT DOCUMENTS

| | | | |
|---|---|---|---|
| 3,195,266 A | | 7/1965 | Onanian |
| 4,050,184 A | * | 9/1977 | Chiari .............................. 446/86 |
| 4,159,592 A | * | 7/1979 | Gabriel ......................... 446/121 |
| 4,843,976 A | * | 7/1989 | Pigott et al. ................... 108/56.1 |
| 5,579,686 A | * | 12/1996 | Pigott et al. ................... 108/56.1 |
| 6,032,556 A | | 3/2000 | Hu |
| 6,773,323 B1 | * | 8/2004 | Huang ............................. 446/93 |
| 7,481,692 B2 | * | 1/2009 | Bruder .......................... 446/122 |
| 8,157,470 B2 | * | 4/2012 | De Wilde ...................... 403/348 |
| 8,382,548 B2 | * | 2/2013 | Maggiore et al. .............. 446/120 |
| 2002/0098774 A1 | * | 7/2002 | Huang ........................... 446/487 |
| 2005/0027301 A1 | | 2/2005 | Stihl |
| 2005/0272301 A1 | * | 12/2005 | Bruder ........................... 439/409 |
| 2012/0210546 A1 | * | 8/2012 | Jang et al. ....................... 24/615 |

FOREIGN PATENT DOCUMENTS

| | | | |
|---|---|---|---|
| DE | 29512467 | | 10/1995 |
| EP | 1598097 | | 11/2005 |
| JP | 52-103244 A | | 8/1977 |
| JP | 03-030682 U1 | | 3/1991 |
| JP | 2000502926 A | | 3/2000 |
| JP | 2005-9644 | * | 1/2005 ............. F16B 21/06 |
| JP | 2005009644 A | | 1/2005 |
| JP | 2009509112 A | | 3/2009 |

OTHER PUBLICATIONS

Chinese Office Action dated Sep. 3, 2014 for related Chinese Application No. 201180036839.5, 7 pages.
Japanese Office Action dated Sep. 18, 2015 for related Japanese Patent Application No. 2013-523107, 6 pages.

* cited by examiner

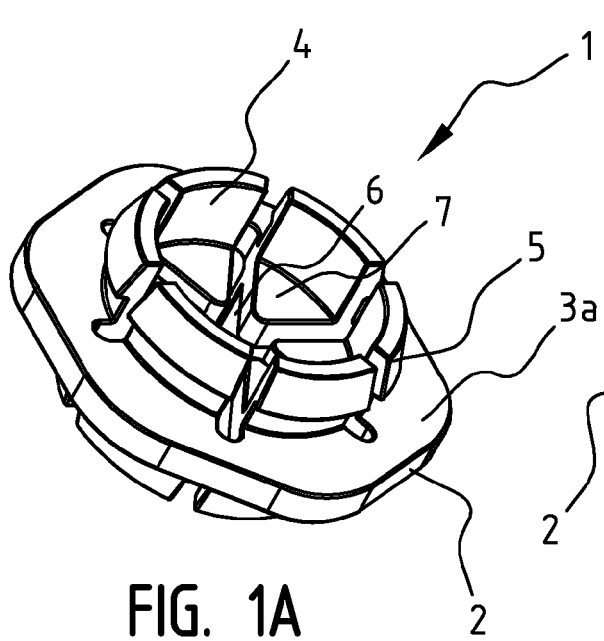
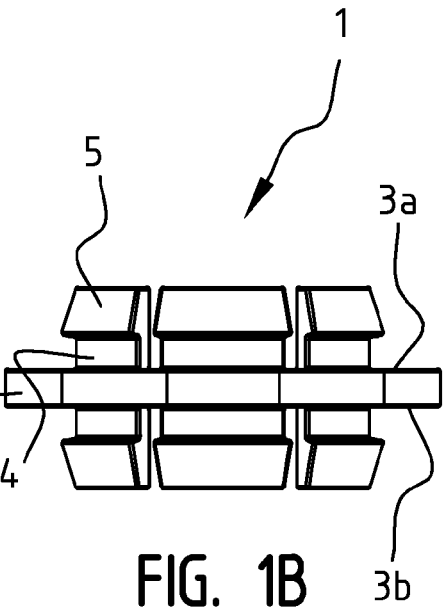
FIG. 1A
FIG. 1B
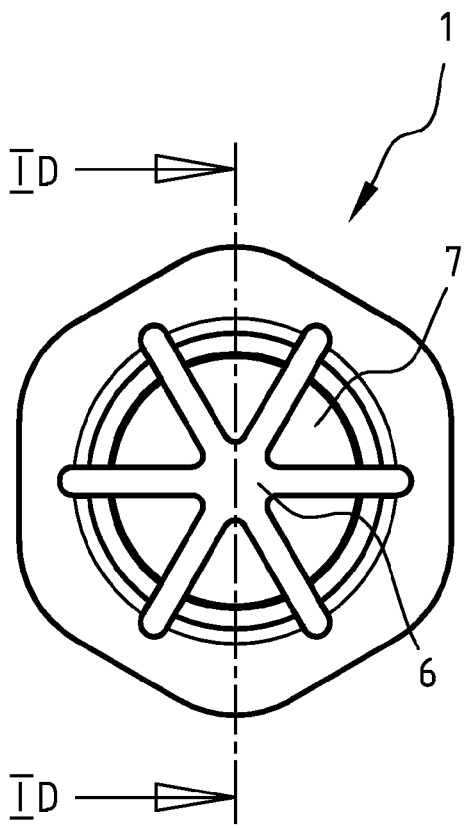
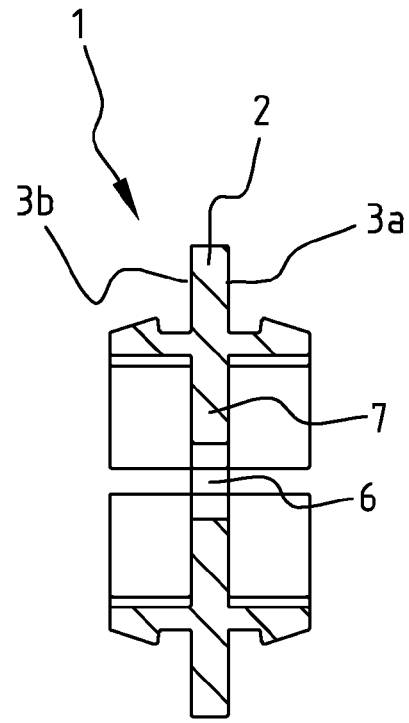
FIG. 1C
FIG. 1D

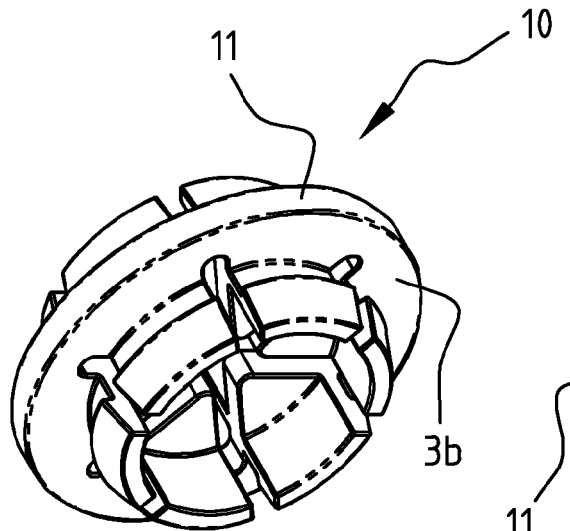
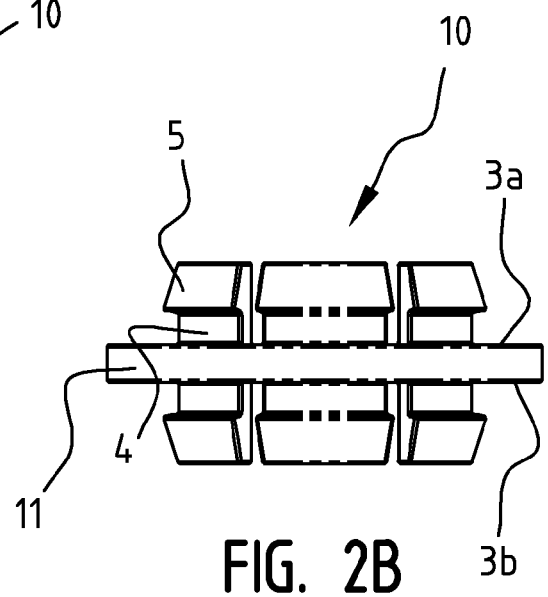
FIG. 2A
FIG. 2B
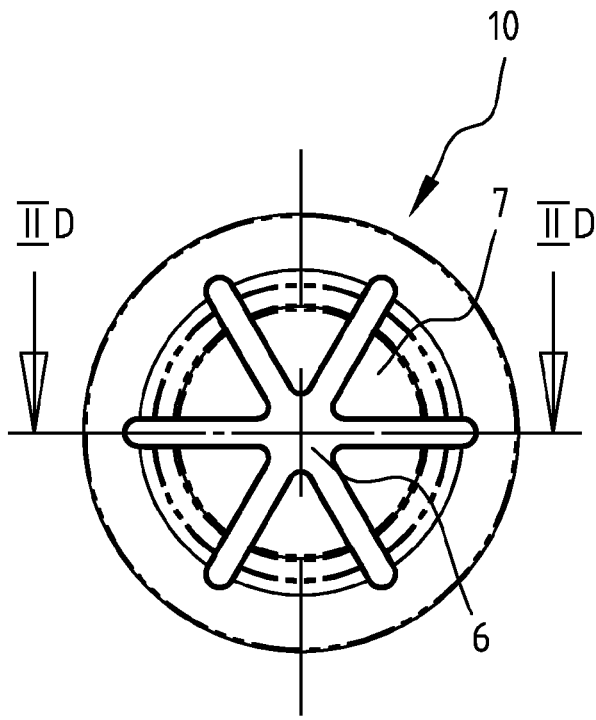
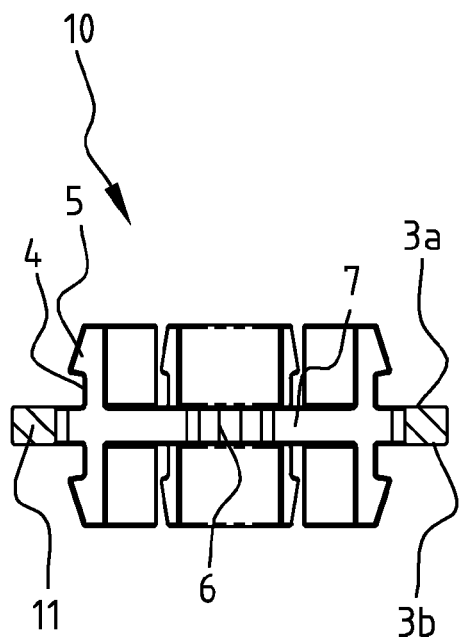
FIG. 2C
FIG. 2D

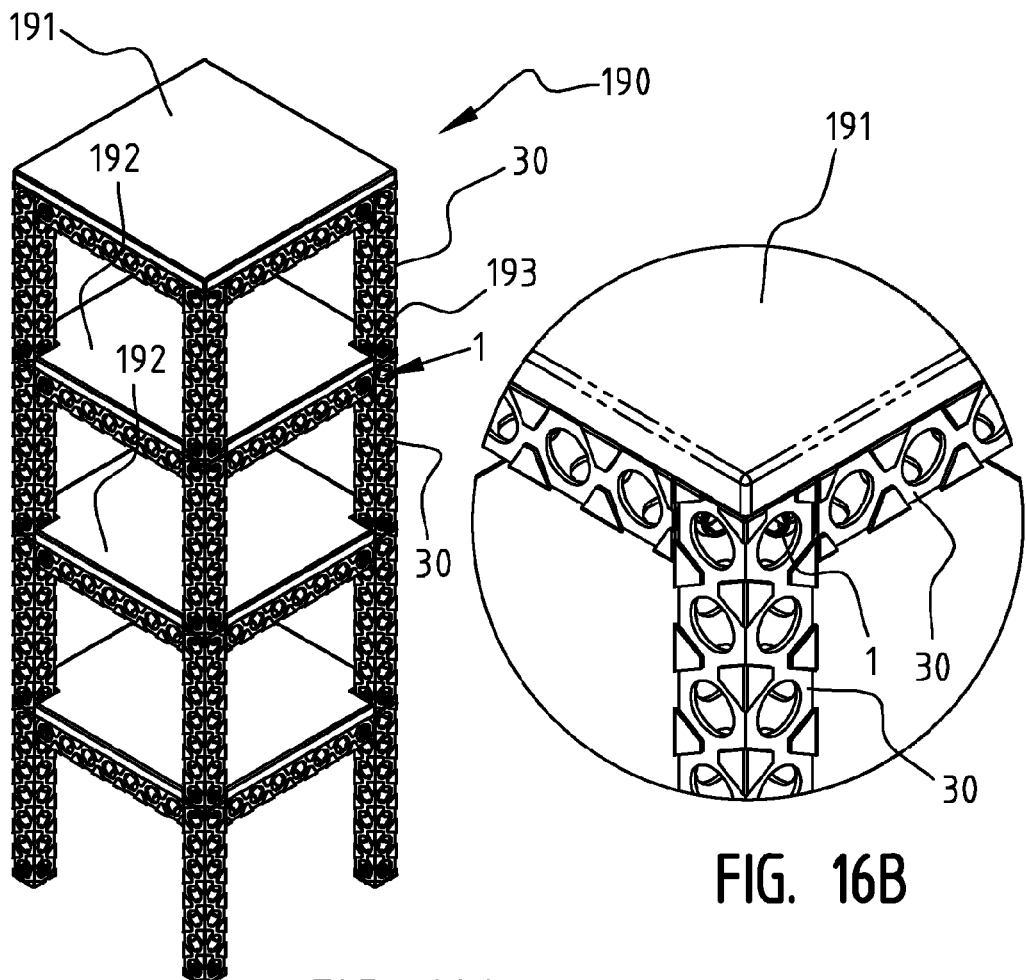
FIG. 16A
FIG. 16B
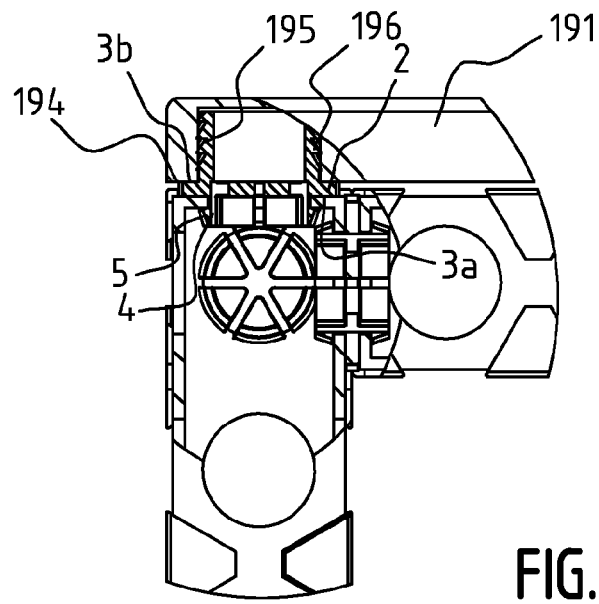
FIG. 16C

MODULAR CONSTRUCTION SYSTEM, CONSTRUCTION ELEMENT, COUPLING ELEMENT, END ELEMENT AND TOOL FOR USE IN SUCH A CONSTRUCTION SYSTEM

RELATED APPLICATIONS

This application is a national stage application, under 35 U.S.C. §371 of International Patent Application No. PCT/NL2011/050544, filed on Jul. 28, 2011 and published as WO 2012/015304 on Feb. 2, 2012, which claims the priority benefit of The Netherlands Patent Application No. 2005186, filed on Jul. 30, 2010, and also claims the priority benefit of The Netherlands Patent Application No. 2005185, filed on Jul. 30, 2010, all of which are hereby incorporated by reference in their entirety.

The invention relates to a modular construction system comprising at least two construction elements and a coupling element which can be connected releasably to the construction elements, wherein:

the coupling element comprises a plate-like body with two flat surfaces which are each provided with coupling means, wherein the coupling means of at least one of the two surfaces comprise a ring of resiliently pivotable lips extending at least substantially perpendicularly of the surface and provided with locking protrusions close to a first end zone;

at least one of the two construction elements comprises at least one surface with at least one opening which is adapted to receive the lips of the coupling element in order to connect the coupling element and the construction element, this opening being smaller than the distance between two opposite protrusions of the lips such that in a connected situation the protrusions of the lips of the coupling element engage on the surface of the construction element close to the opening; and the lips are adapted to displace inward at least close to their first end zones subject to a force exerted on the coupling element such that the distance between the two opposite protrusions of the lips can decrease to less than the size of the opening in the construction element in order to release the connection between the coupling element and the construction element.

Such a modular construction system can for instance be used for educational purposes, as toy or for the assembly of stands, furniture, machine constructions and the like.

Such a modular construction system is known from EP-A1-1 598 097. The construction system of EP-A1-1 598 097 comprises a plurality of building blocks and one or more connecting pieces. The building block of EP-A1-1 598 097 comprises a square assembly opening with a funnel in which lips of a connecting piece can be received. In order to release the connection between a connecting piece and a building block the connecting piece is rotated through 45° such that the lips extend in the diagonal direction of the assembly opening, wherein the length of the diagonal of the assembly opening is greater than the distance between two opposite protrusions, such that the connecting piece can be removed from the assembly opening.

The invention has for its object to provide a modular construction system with which construction elements can be coupled and uncoupled in simple manner and/or a modular construction system with which diverse assemblies can be easily constructed.

For this purpose the modular construction system of the type stated in the preamble has the feature according to the invention that the plate-like body of the coupling element comprises an opening which extends between the two flat surfaces, this opening of the plate-like body being provided with resiliently pivotable tongues extending radially inward which are connected to the lips, wherein the tongues of the opening of the plate-like body are displaced out of the plane of the plate-like body at least close to a first outer end of the tongues by a force being exerted thereon, such that due to displacement of the tongues out of the plane of the plate-like body the lips are displaced inward.

An advantage of such a coupling element is that the mutual coupling of two construction elements can take place in simple manner, while the coupling can also be released in simple manner using such a coupling element. Release of the coupling takes place in simple manner by exerting a force on the tongues, wherein the lips are displaced inward, whereby the distance between the two opposite protrusions decreases to less than the size of the opening in the construction element such that the coupling element can be easily removed from the opening in the construction element.

When it does not comprise a ring of lips, the other surface can be provided with random, optionally known coupling means such as a dowel, a pin-like body provided with screw thread, adhesive means, hooks or loops for forming a so-called velcro tape connection, and so on.

In a preferred embodiment of the modular construction system the coupling means of each of the two surfaces comprise a ring of resiliently pivotable lips extending at least substantially perpendicularly of the surface and provided with locking protrusions close to a first end zone.

In another preferred embodiment of the modular construction system according to the invention the surface of the construction element is provided with a standing edge extending round the opening in the surface, wherein in the connected situation the plate-like body of the coupling element extends at least partially inside the standing edge.

In another embodiment of the modular construction system according to the invention the standing edge of the construction element has a polygonal form.

In a subsequent embodiment of the modular construction system according to the invention the plate-like body of the coupling element has a polygonal form, wherein in the connected situation corner points of the plate-like body are situated in corner points of the standing edge.

A distance between two opposite corner points of the plate-like body of the coupling element is preferably greater than a distance between two opposite sides of the standing edge of the construction element, such that a force exceeding a predetermined value is necessary for rotation of the coupling element in the plane of the construction element.

An advantage hereof is that two construction elements can in this way be connected in a more or less fixed position and at a more or less fixed angle relative to each other. Rotation is possible when a relative rotation force exerted on the coupling element and/or a construction element exceeds a predetermined value, whereby the angle between two construction elements can easily be changed without uncoupling of the coupling element being required for this purpose. When the force is released, the construction elements will be fixed at the new angle. The predetermined force can for instance be equal to the force required to elastically deform the plate-like body of the coupling element and/or the standing edge of the construction element.

Alternatively, the standing edge of the construction element can have interruptions close to its corner points.

An advantage of a construction element provided with an edge having interruptions is that it can be manufactured in simple manner, for instance by injection moulding. Material for manufacturing the construction element can hereby also be saved.

In yet another embodiment of the modular construction system according to the invention the standing edge of the construction element has a round form.

In a subsequent embodiment of the modular construction system according to the invention the plate-like body has a round form, wherein the diameter of the plate-like body is smaller than a distance between two opposite sides of the standing edge of the construction element, such that rotation of the coupling element in the plane of the construction element can take place freely.

An advantage of the free rotation of the coupling element in the plane of the construction element is that a construction assembly can hereby be manufactured in simple manner, wherein different construction elements can rotate freely relative to each other. It is noted that two opposite sides of the standing edge is also understood to mean the diameter of a round edge.

The invention further relates to a construction element, component of a modular construction system as described above, comprising at least one surface with at least one opening which is adapted to receive the lips of a coupling element in order to connect the coupling element and the construction element, this opening being smaller than the distance between two opposite protrusions of the lips, such that in a connected situation the protrusions of the lips of the coupling element engage on the surface of the construction element close to the opening.

The invention further relates to a coupling element, component of a modular construction system as described above, comprising a plate-like body with two flat surfaces which are each provided with coupling means, wherein the coupling means of at least one of the two surfaces comprise a ring of resiliently pivotable lips extending at least substantially perpendicularly of the surface and provided with locking protrusions close to a first end zone, wherein the lips are adapted to displace inward at least close to their first end zones subject to a force exerted on the coupling element, such that the distance between the two protrusions of the lips situated opposite each other can decrease to less than the size of an opening in a construction element in order to release a connection between the coupling element and the construction element, wherein the plate-like body of the coupling element comprises an opening which extends between the two flat surfaces, this opening of the plate-like body being provided with resiliently pivotable tongues extending radially inward which are connected to the lips, wherein the tongues of the opening of the plate-like body are displaced out of the plane of the plate-like body at least close to a first outer end of the tongues by a force being exerted thereon, such that due to displacement of the tongues out of the plane of the plate-like body the lips are displaced inward.

When it does not have a ring of lips, the other surface can be provided with random, optionally known coupling means such as a dowel, a pin-like body provided with screw thread, adhesive means, hooks or loops for forming a so-called velcro tape connection, and so on.

The coupling means of each of the two surfaces preferably comprise a ring of resiliently pivotable lips extending at least substantially perpendicularly of the surface and provided with locking protrusions close to a first end zone.

The invention also relates to an end element, comprising a plate-like body with a flat surface which is provided with a ring of resiliently pivotable lips extending at least substantially perpendicularly of the surface and provided with locking protrusions close to a first end zone.

Such an end element can be easily connected to one construction element in the manner described above for the coupling element, whereby an unused opening in the construction element can be filled. When the surface remote from the lips is not provided with lips, this surface can be finished in aesthetic manner. Unused openings in the construction element can hereby be filled in aesthetic manner.

The construction element and/or the coupling element and/or the end element are preferably manufactured from a material chosen from the group comprising plastic, metal and wood. A suitable plastic is for instance acrylonitrile butadiene styrene (ABS), polypropylene (PP) and/or polyethylene (PE).

The construction element and/or the coupling element and/or the end element can for instance be manufactured by injection moulding.

The invention also relates to a tool for use in a modular construction system as described above, the tool comprising a body provided with at least one pin-like body which is adapted to displace tongues of an opening of a plate-like body of a coupling element out of the plane of the plate-like body, at least close to first outer ends of the tongues.

Using such a tool a pressing force can be exerted on the tongues of the coupling element in simple manner in order to uncouple the coupling element.

The invention also relates to the use of such a tool for uncoupling a coupling element by exerting a force on the tongues of the coupling element.

The pin-like body preferably extends at an angle from the handle, the angle lying between 0 and 90°.

In a preferred embodiment of the tool according to the invention the tool comprises a displaceable flange extending round the pin-like body, the flange being displaceable between a first position, in which the flange is smaller than the diameter of the opening of the construction element, and a second position in which the flange is larger than the diameter of the opening of the construction element, wherein the pin-like body is displaceable between the first position, in which the pin-like body extends with a first determined length from the body, and a second position in which the pin-like body extends with a second determined length from the body, the second determined length being greater than the first determined length, and wherein the pin-like body is in respectively the first or the second position when the flange is in respectively the first or the second position.

The invention also relates to a packaging comprising at least one of a construction element, a coupling element, an end element or a tool as described above.

The invention will be further elucidated with reference to figures shown in a drawing, in which FIGS. 1A-1D show a perspective view, side view, front view and cross-sectional view of a coupling element of a modular construction system according to an embodiment of the invention;

FIGS. 2A-2D show a perspective view, side view, front view and cross-sectional view of a coupling element of a modular construction system according to another embodiment of the invention;

Figure 17A:
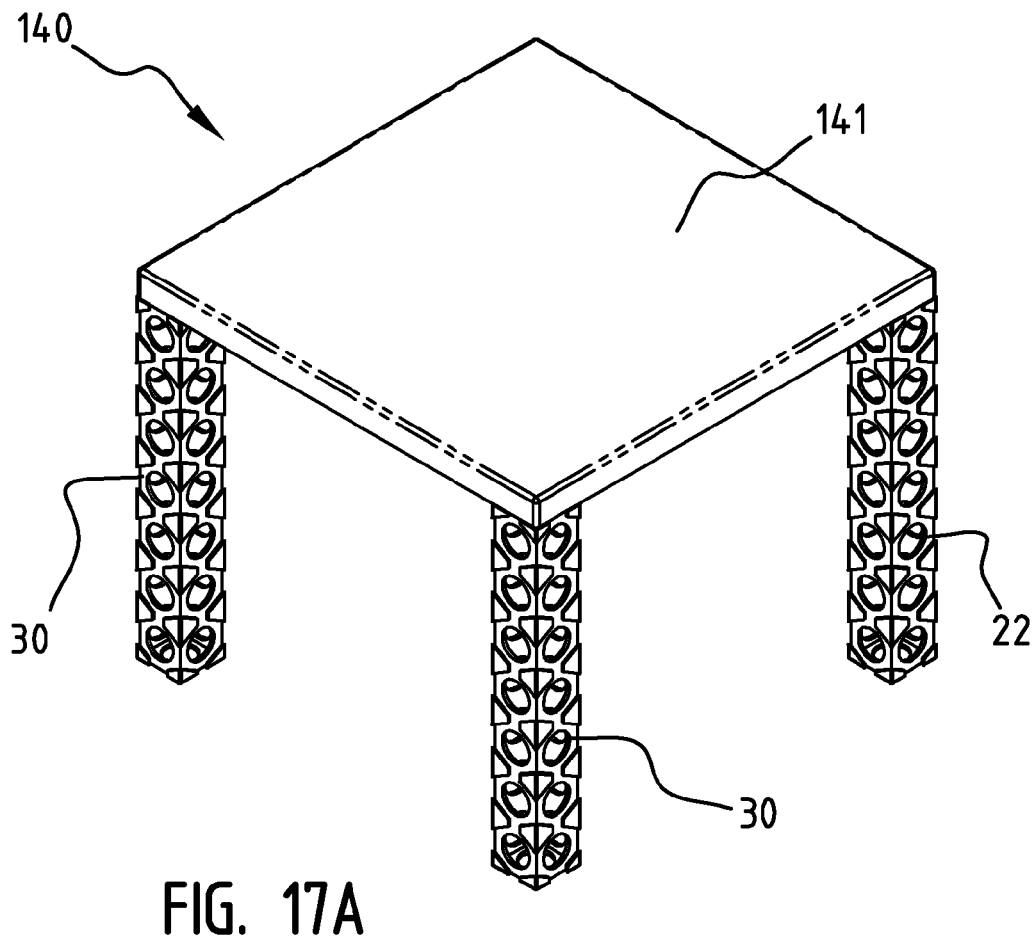
Figure 17B:
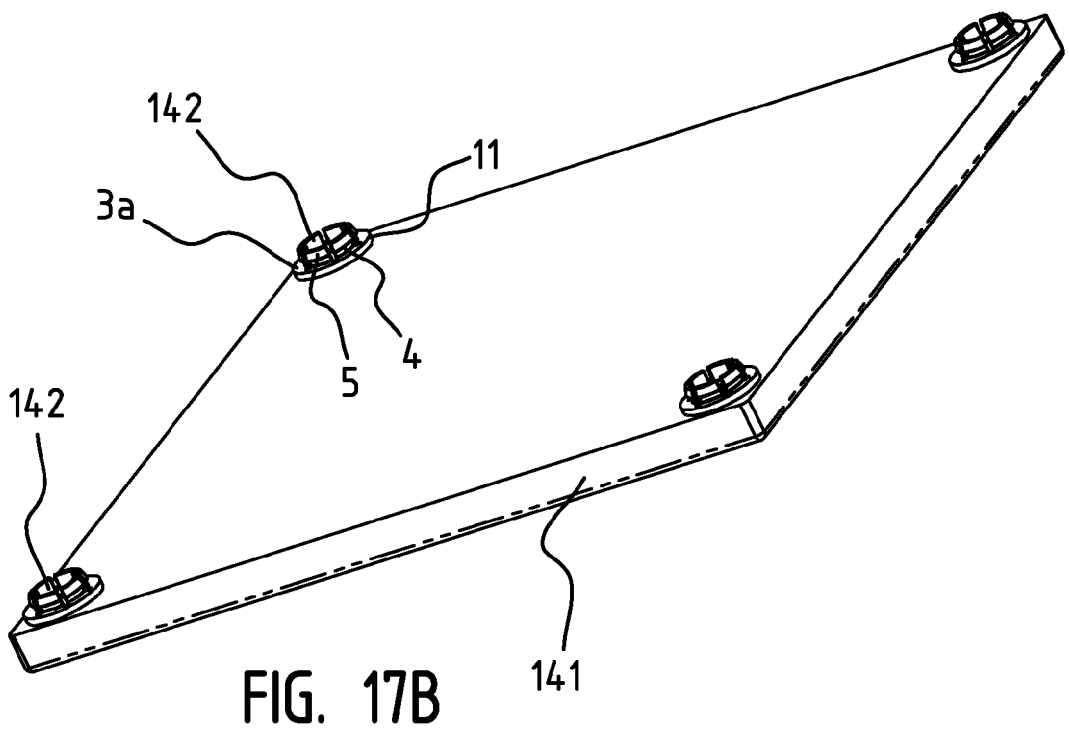

FIGS. 16A-16C show a shelving system constructed with a modular construction system according to the invention, wherein A shows a perspective view of the shelving system, B shows a part of the shelving system in detail and C shows a cross-section of the part in B; and FIGS. 17A, 17B show a table constructed with a modular construction system according to the invention, wherein A shows a perspective view of the table and B shows the table-top in detail.

FIGS. 1A-1D show respectively a perspective view, side view, front view and cross-sectional view of a coupling element 1. Coupling element 1 comprises a hexagonal, plate-like body 2 with two mutually parallel flat surfaces 3a,3b, which are each provided with a ring of resiliently pivotable lips 4 extending at least substantially perpendicularly of the surface and each provided with a protrusion 5 close to a first end zone. Extending in plate-like body 2 between the two flat surfaces 3a,3b is an opening 6 which is provided with resiliently pivotable tongues 7 extending radially inward which are connected to lips 4.

FIGS. 2A-2D show respectively a perspective view, a side view, a front view and cross-sectional view of a coupling element 10 according to another embodiment of the invention. Coupling element 10 comprises a round, plate-like body 11 with two mutually parallel flat surfaces 3a,3b, which are each provided with a ring of resiliently pivotable lips 4 extending at least substantially perpendicularly of the surface and each provided with a protrusion 5 close to a first end zone. Extending in plate-like body 2 between the two flat surfaces 3a,3b is an opening 6 which is provided with resiliently pivotable tongues 7 extending radially inward which are connected to lips 4.

FIGS. 3-8 show a number of construction elements 20, 30, 40, 50, 60, 70 according to different embodiments of the invention.

Figure 3:
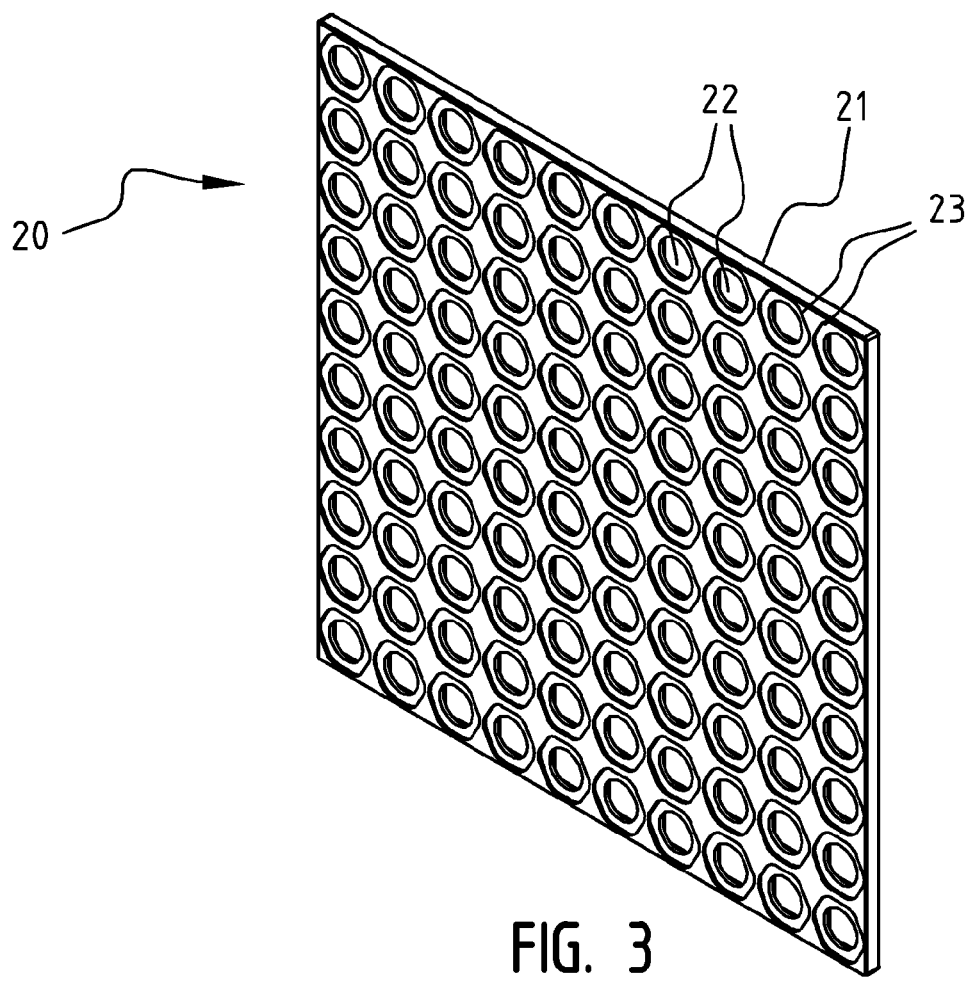
FIGS. 3-8 show perspective views of a number of construction elements of a modular construction system according to different embodiments of the invention.

FIG. 3 shows a construction element 20 comprising a plate-like body 21, wherein a number of openings 22 extend between the two outer surfaces of plate-like body 21. Construction element 20 can function as a kind of basic construction plate on which a construction assembly can be built. The outer surfaces of plate-like body 21 are each provided with a standing edge 23 which extends round each opening 22. In this embodiment the standing edge 23 has a regular, hexagonal form.

Figure 4:
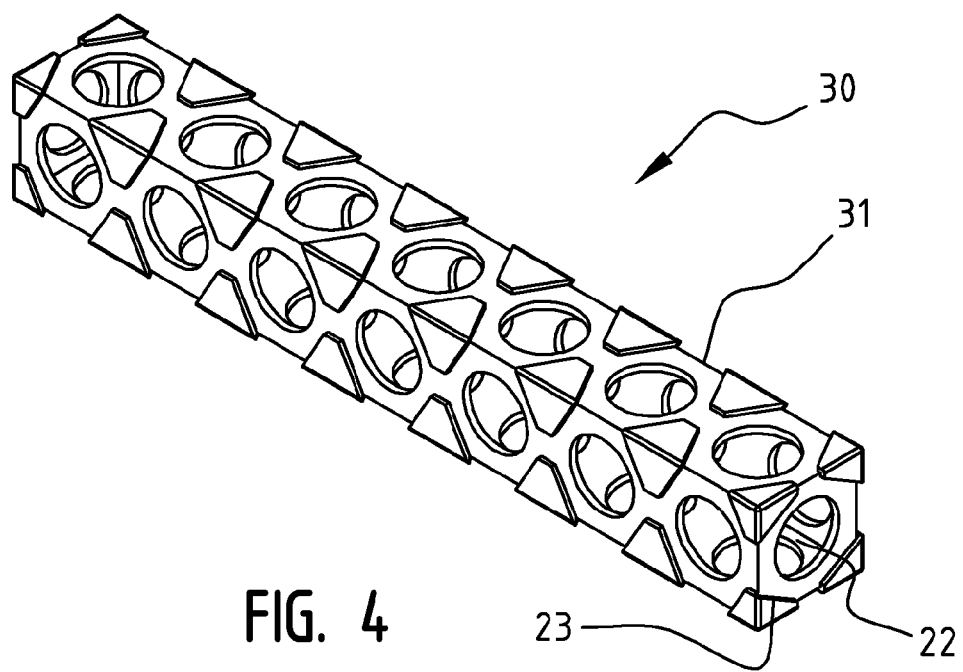

FIG. 4 shows a construction element 30 according to another embodiment of the invention, this construction element 30 comprising a beam-like body 31, wherein a number of openings 22 extend in the outer surfaces of beam-like body 31. The outer surfaces of beam-like body 31 are each provided with a standing edge 23 which extends round each opening 22. In this embodiment standing edge 23 has a regular, hexagonal form and is interrupted in the vicinity of its corner points.

Figure 5:
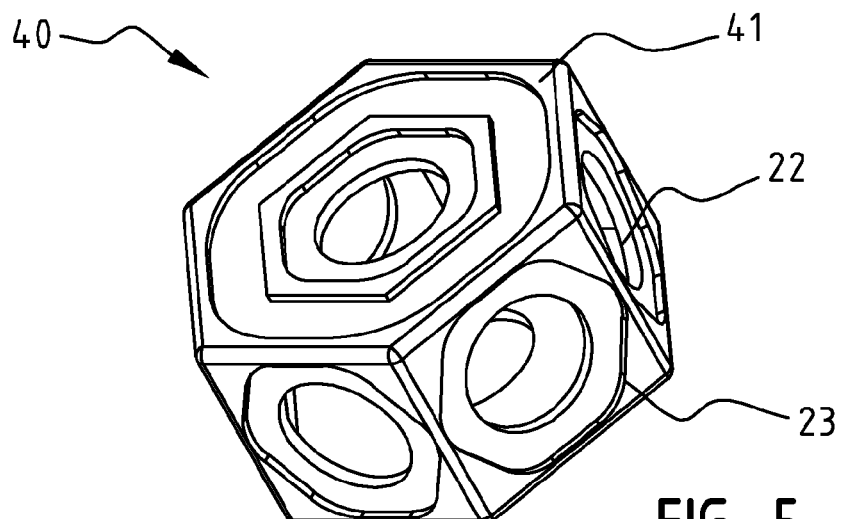

FIG. 5 shows a construction element 40 according to yet another embodiment of the invention, this construction element 40 comprising a nut-like body 41, wherein a number of openings 22 extend in the outer surfaces of nut-like body 41. The outer surfaces of nut-like body 41 are each provided with a standing edge 23 which extends round each opening 22. In this embodiment standing edge 23 has a regular, hexagonal form.

Figure 6A:
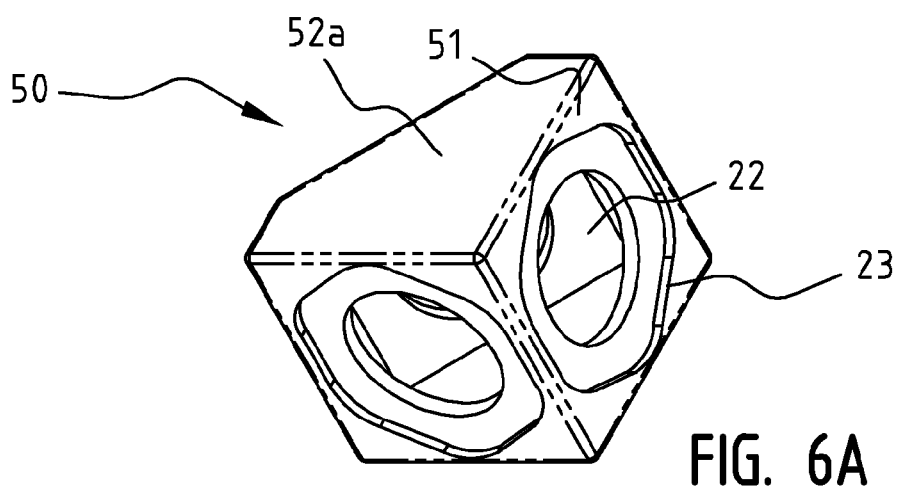
Figure 6B:
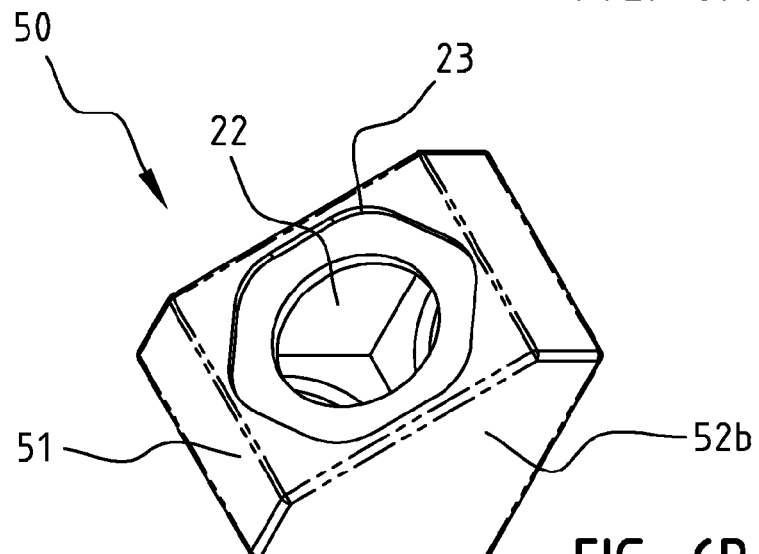

FIGS. 6A, 6B show a construction element 50 according to yet another embodiment of the invention, this construction element 50 comprising a body 51 in the form of a obliquely cut cube, wherein a number of openings 22 extend in three outer surfaces of body 51. The three outer surfaces of body 51 provided with openings 22 are provided with a standing edge 23 which extends round each opening 22. In this embodiment standing edge 23 has a regular, hexagonal form. It will be apparent that the cut side surfaces 52a,52b of body 51 are not provided with openings 22.

Figure 7:
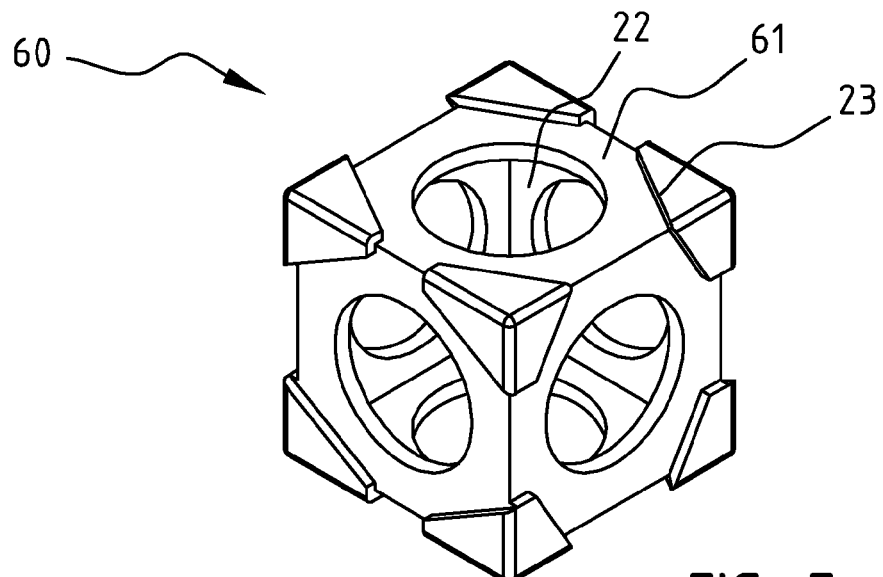

FIG. 7 shows a construction element 60 according to yet another embodiment of the invention, this construction element 60 comprising a cube-like body 61, wherein a number of openings 22 extend in the outer surfaces of body 61. The outer surfaces of body 61 are each provided with a standing edge 23 which extends round each opening 22. In this embodiment standing edge 23 has a regular, hexagonal form and is interrupted in the vicinity of its corner points.

Figure 8:
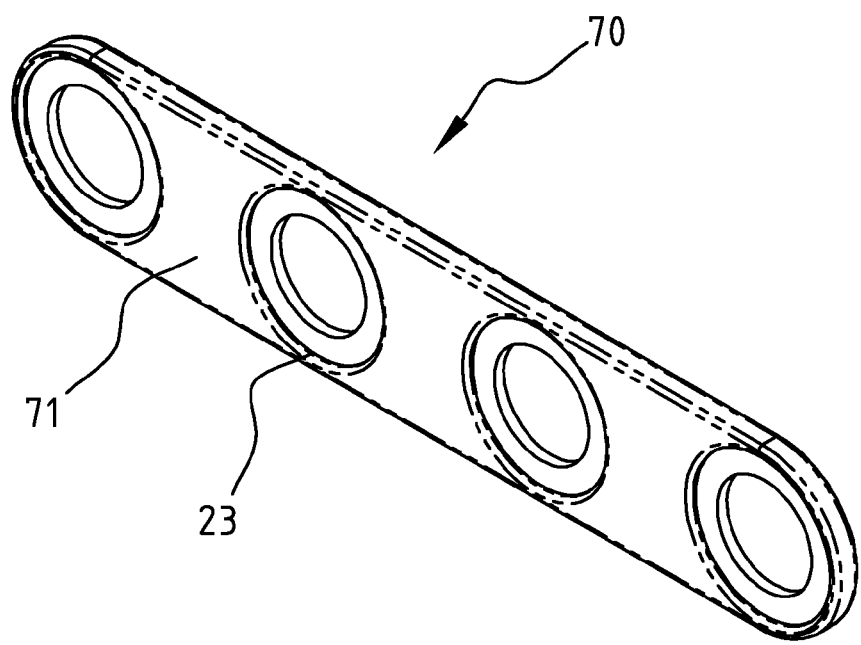

FIG. 8 shows a construction element 70 according to yet another embodiment of the invention, this construction element 70 comprising an elongate, plate-like body 71 with rounded outer ends, wherein a number of openings 22 extend in the outer surfaces of body 71. The outer surfaces of body 71 are each provided with a standing edge 23 which extends round each opening 22. In this embodiment standing edge 23 has a round form.

Figure 9A:
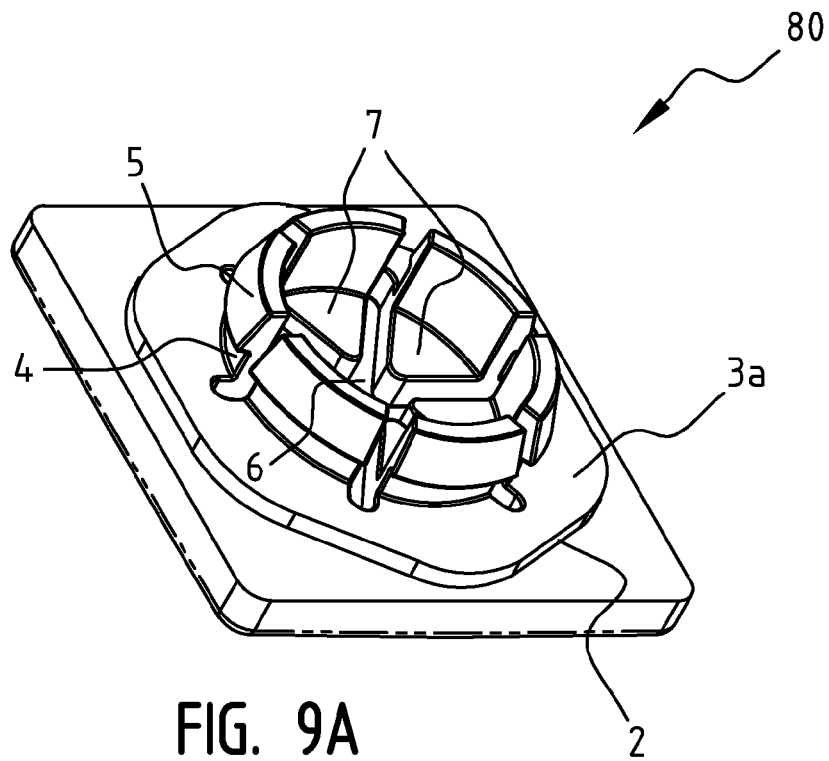
FIGS. 9A, 9B show a perspective view and front view of an end element according to an embodiment of the invention.
Figure 9B:
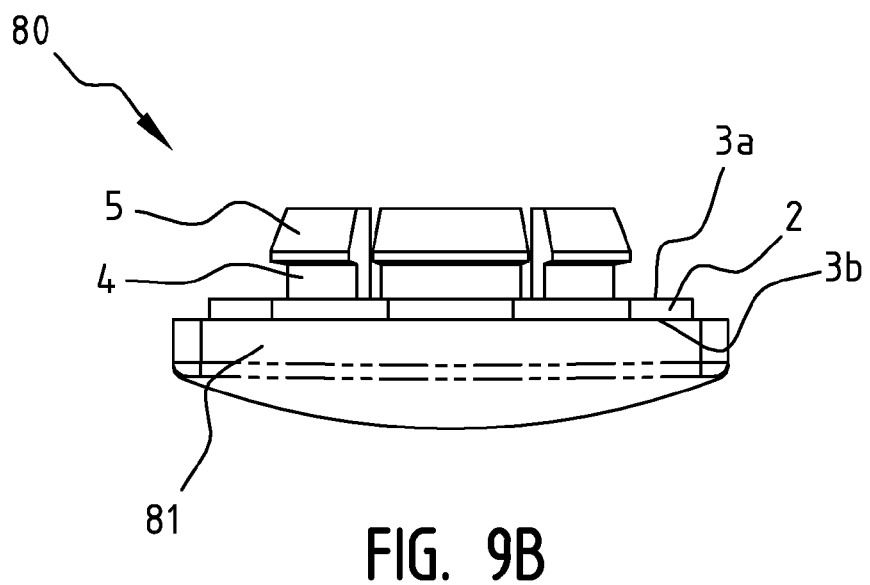

FIG. 9 shows an end element 80 according to an embodiment of the invention. Such an end element 80 is embodied as a coupling element 1 with a hexagonal plate-like body 2 with two flat surfaces 3a,3b. In end element 80 only one surface 3a is however provided with a ring of resiliently pivotable lips 4 extending at least substantially perpendicularly of surface 3a and each provided with a protrusion 5 close to a first end zone. An aesthetic rounded finish is provided on the other surface 3b.

In order to enable mutual connection of two construction elements, lips 4 of a coupling element 1 or 10 are arranged in an opening 22 of a construction element 20, 30, 40, 50, 60 or 70. The distance between two opposite protrusions 5 of lips 4 is larger than opening 22, whereby lips 4 displace inward close to their first end zones when arranged, this being possible because lips 4 are resiliently pivotable. Once lips 4 have been wholly arranged in opening 22, lips 4 will displace outward to their original, substantially perpendicular position relative to the surface such that protrusions 5 engage on the surface of construction element 20, 30, 40, 50, 60 or 70 close to opening 22.

Figure 10:
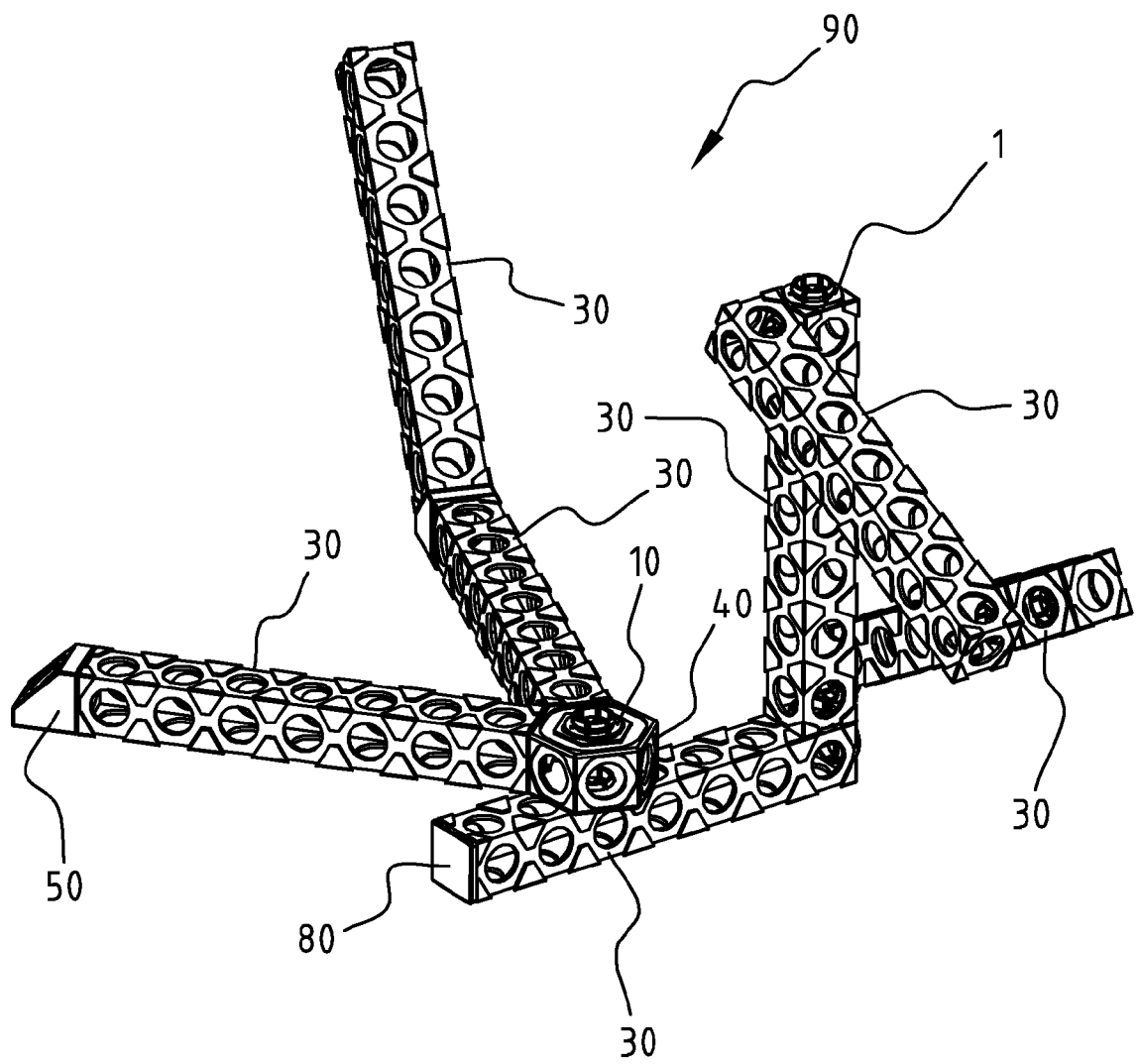
FIG. 10 shows a perspective view of a construction assembly constructed with a modular construction system according to the invention.

FIG. 10 shows a construction assembly 90 created by mutually connecting a number of construction elements 30, 40, 50 and an end element 80 using coupling elements 1,10. It will be apparent that different types of construction assembly can be produced by mutually connecting different construction elements, and that FIG. 10 serves only by way of illustration.

FIGS. 10 and 11 show that in the connected position plate-like body 2 of coupling element 1 or 10 extends at least partially inside the standing edge 23 of a construction element 20, 30, 40, 50, 60 or 70.

When the hexagonal coupling element 1 is coupled to a construction element 20, 30, 40, 50 or 60 with a hexagonal edge 23, the corner points of plate-like body 2 of coupling element 1 are situated in the corner points of edge 23. Because a distance between two opposite corner points of plate-like body 2 of coupling element 1 is greater than a distance between two opposite sides of standing edge 23 of construction element 20, 30, 40, 50 or 60, coupling element 1 is fixed in the arranged position, whereby it is possible to mutually connect two construction elements 20, 30, 40, 50 or 60 with a determined position and at a determined angle. Coupling element 1 can be rotated in the surface of construction element 20, 30, 40, 50 or 60 with a force which exceeds a predetermined value. Rotation is possible because elastic deformation of plate-like body 2 of coupling element 1 and/or elastic deformation of construction element 20, 30, 40, 50 or 60 can take place when the predetermined force is exceeded. Due to relative rotation the angle between the two construction elements 20, 30, 40, 50 or 60 can be easily adjusted without coupling element 20 having to be uncoupled for this purpose.

The hexagonal coupling element 1 can likewise be coupled to a construction element 70 with a round edge 23. Because the distance between the two opposite corner points of plate-like body 2 of coupling element 1 is smaller than the diameter of the round edge 23 of construction element 70, coupling element 1 can rotate freely in the surface of construction element 70.

When coupling element 1 is connected on one side to construction element 70 with round edge 23 and on the other to a construction element 20, 30, 40, 50 or 60 with a hexagonal edge 23, it is possible for construction element 70 to rotate freely relative to construction element 20, 30, 40, 50 or 60, while this construction element 20, 30, 40, 50 or 60 can be positioned fixedly relative to other construction elements 20, 30, 40, 50 or 60.

Coupling element 10 with the round plate-like body 2 can further be coupled to construction elements 20, 30, 40, 50, 60 or 70. Because the diameter of the round plate-like body 2 of coupling element 10 is smaller than the distance between the two opposite sides of standing edge 23 of construction element 20, 30, 40, 50 or 60 or the diameter of standing edge 23 of construction element 70, construction elements 20, 30, 40, 50, 60 or 70 can rotate freely relative to each other.

Figure 11A:
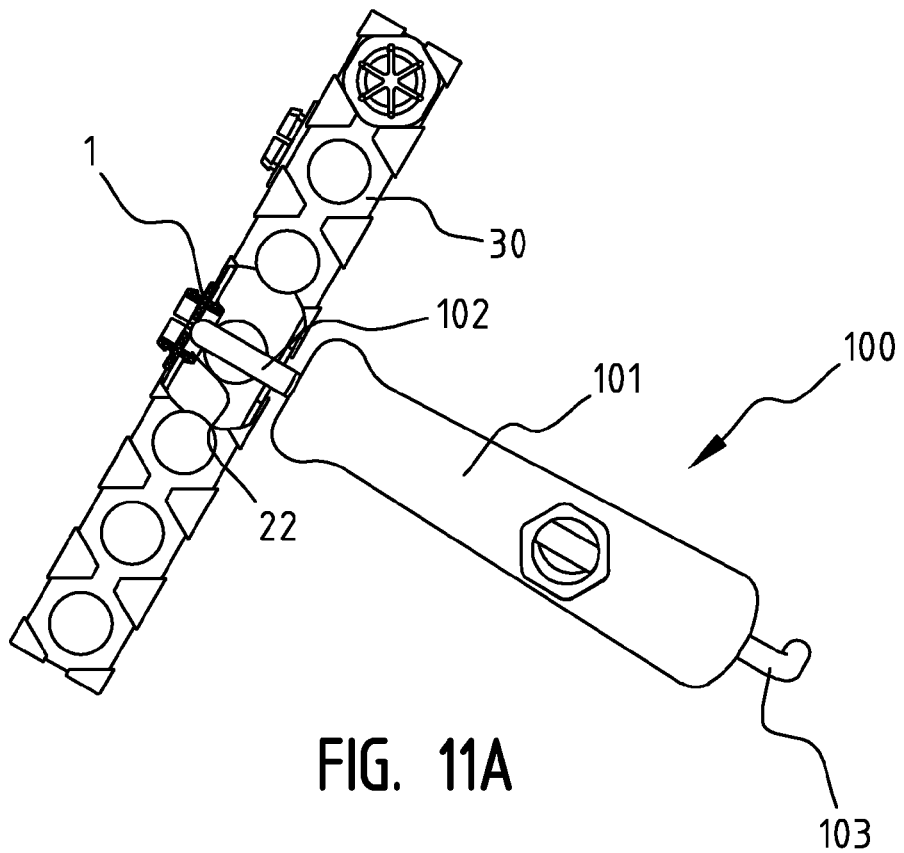
FIGS. 11A-11C show uncoupling of a coupling element of FIG. 1.
Figure 11B:
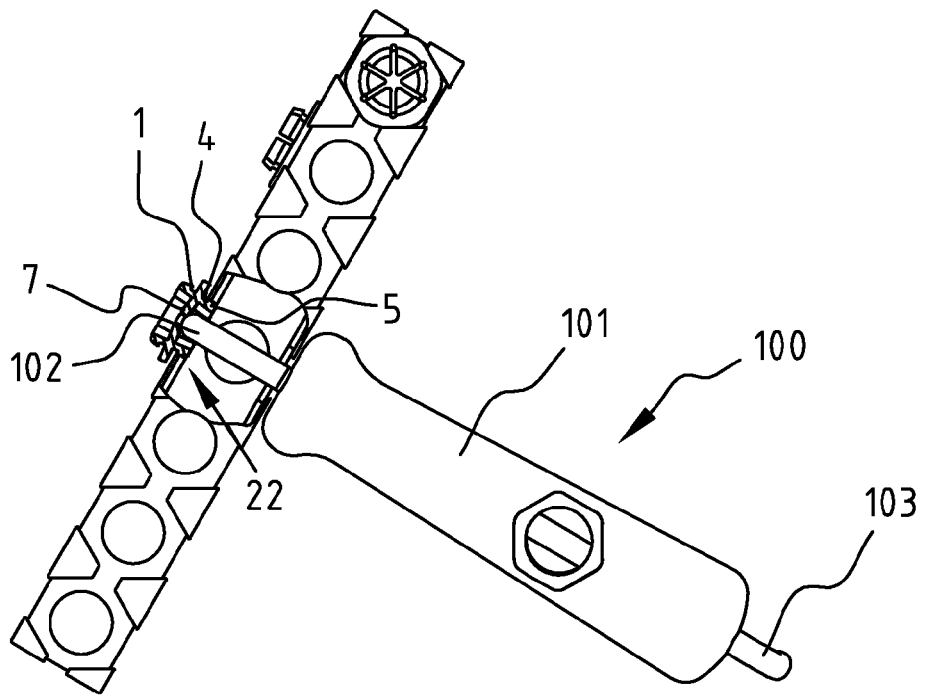

FIGS. 11A, 11B show the removal of a coupling element 1 from opening 22. As shown in FIG. 11B, lips 4 have to be displaced inward such that the distance between opposite protrusions 5 of lips 4 decreases to less than the size of opening 22. The inward displacement of lips 4 takes place by exerting a pressing force an tongues 7, which under the influence of the pressing force are simultaneously displaced out of the plane of plate-like body 2 at least close to a first outer end thereof, whereby the lips 4 connected to tongues 7 will displace inward. As shown in FIG. 11B, these lips 4, which extend in an opposite direction relative to the direction of displacement of tongues 7, will displace inward.

Figure 11C:
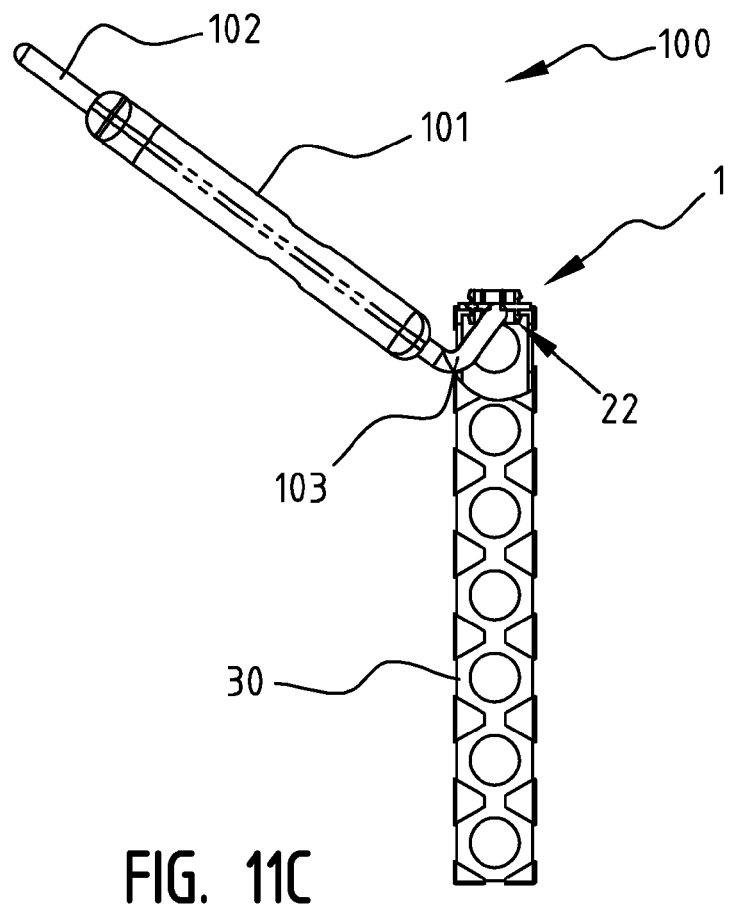
Figure 12:
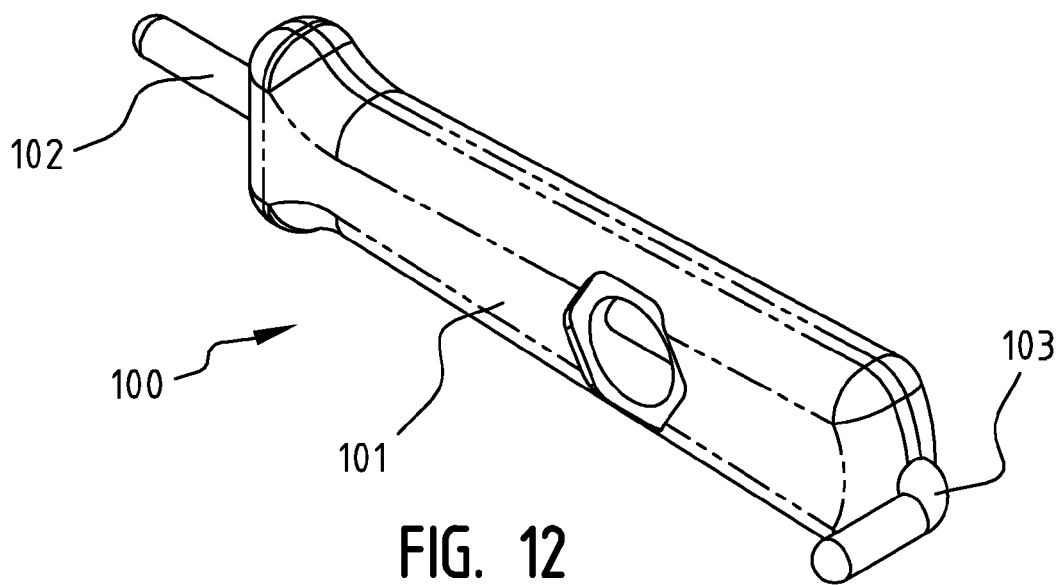
FIG. 12 shows a perspective view of a tool according to a first embodiment of the invention.
Figure 13A:
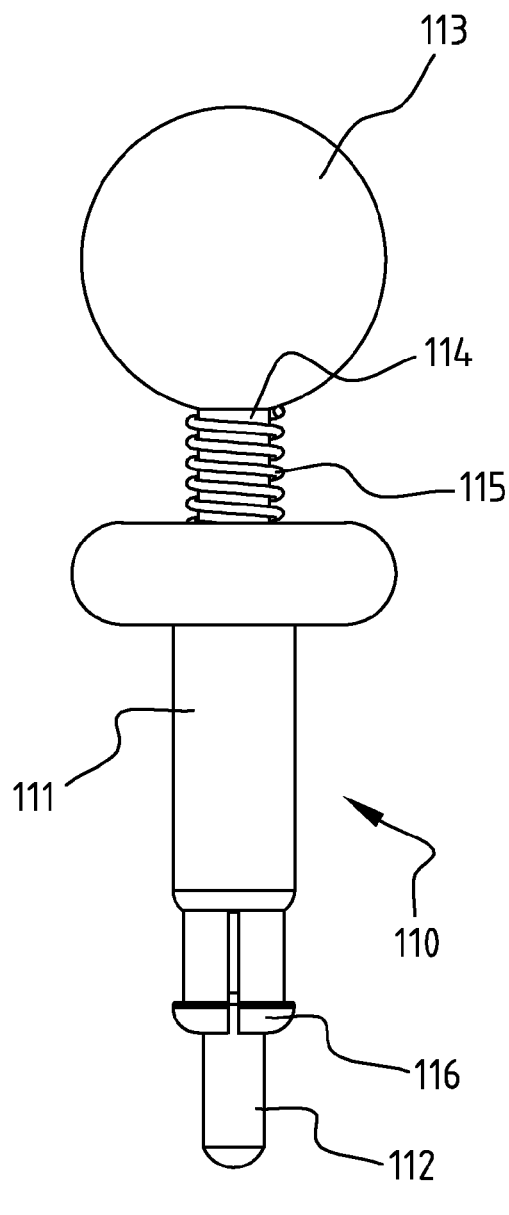
FIGS. 13A-13D show a perspective view of a tool according to a second embodiment of the invention.
Figure 13B:
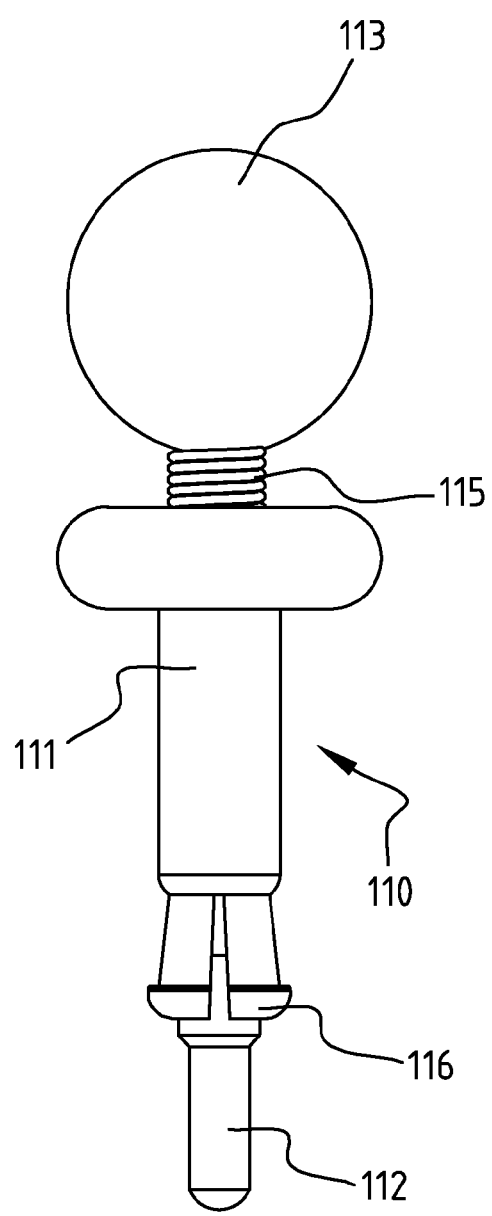
Figure 13C:
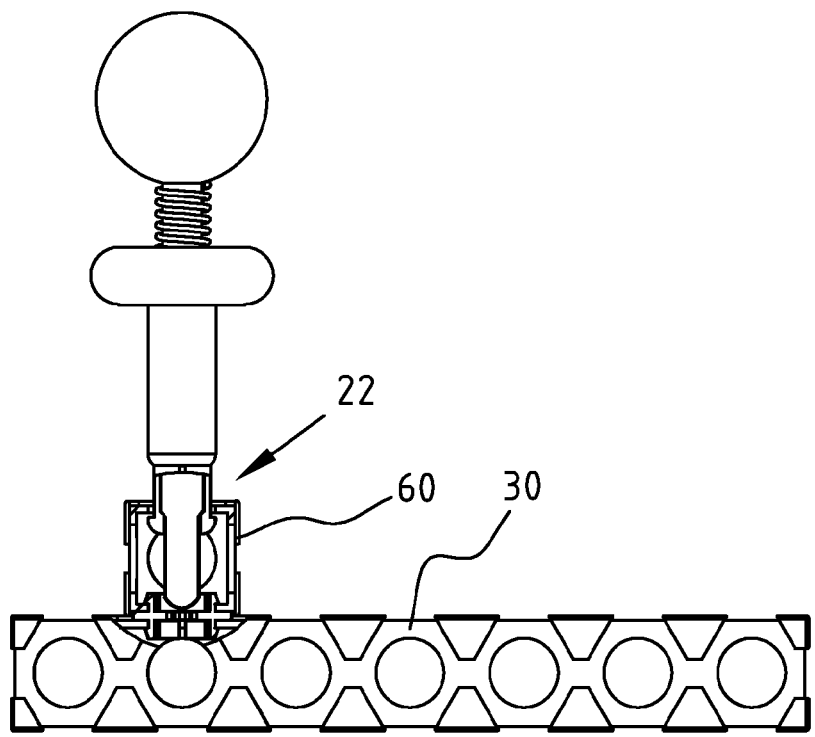
Figure 13D:
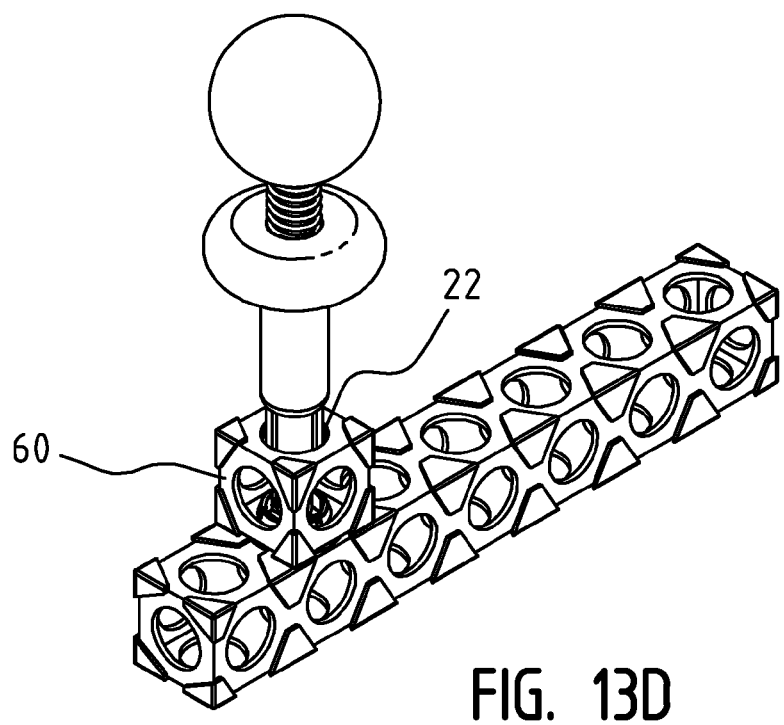
Figure 14A:
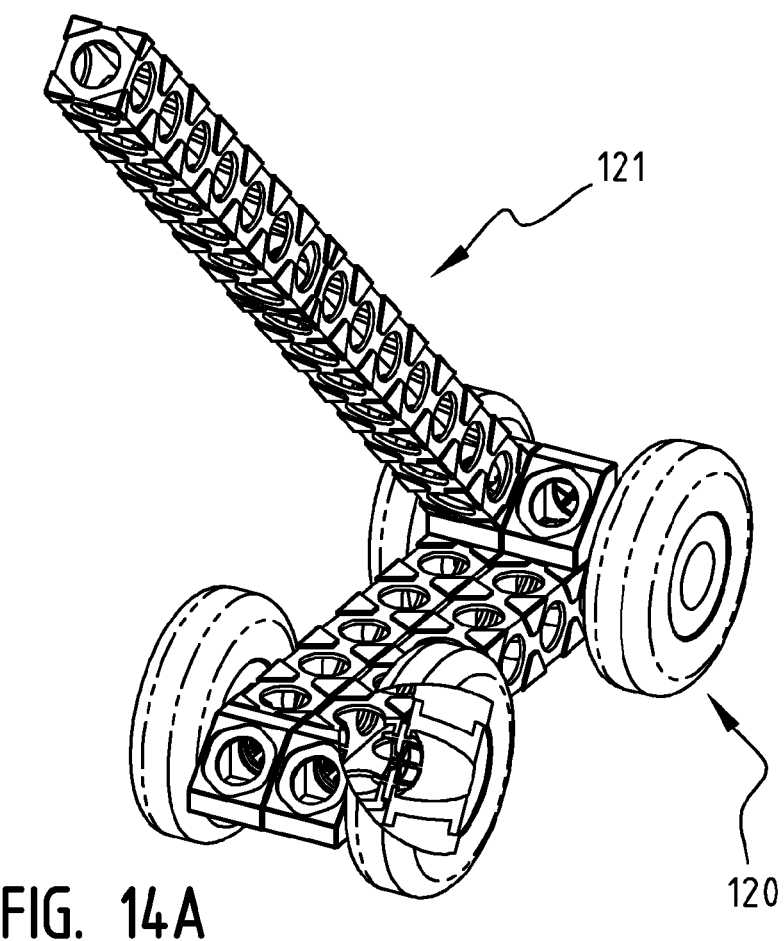
FIGS. 14A-14D show another construction element of a modular construction system according to the invention.
Figure 14B:
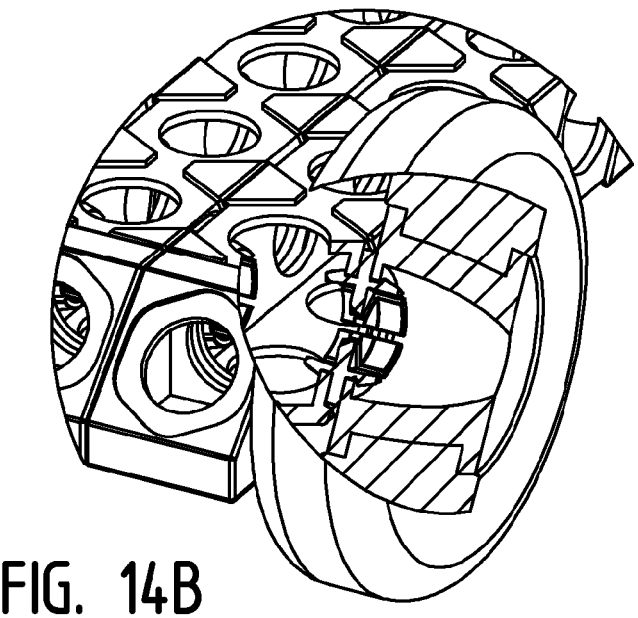
Figure 14C:
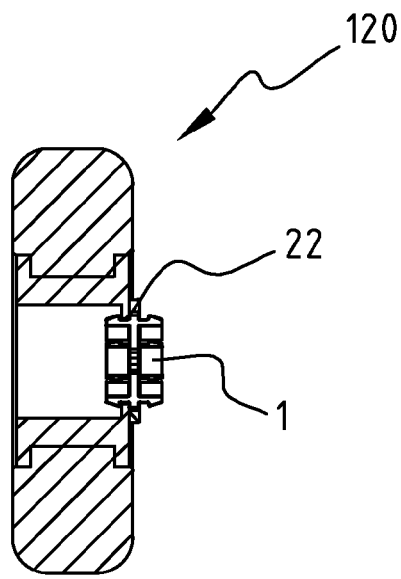
Figure 14D:
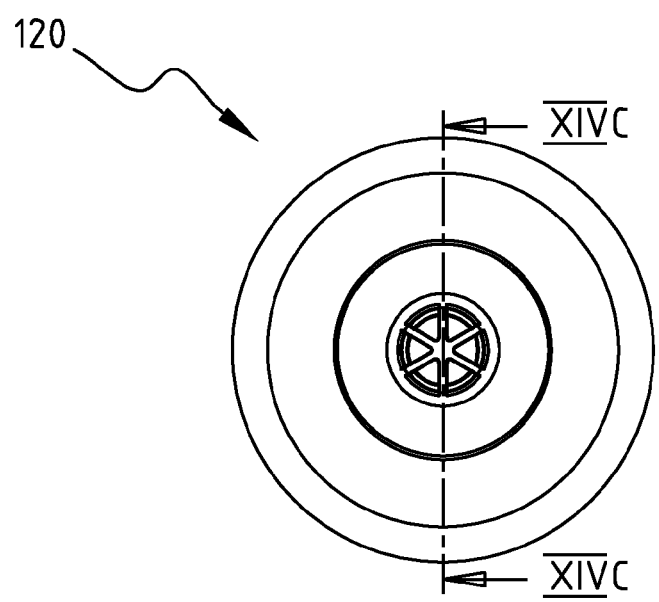

As shown in FIGS. 11A-11C, a tool 100 can be used to remove coupling element 1 from opening 22, this tool 100 being shown in FIG. 12. Tool 100 comprises a body in the form of a handle 101, the handle 101 comprising two pin-like bodies 102, 103 with which the tongues 7 of opening 6 of plate-like body 2 can be pressed in resilient manner out of the plane of plate-like body 2. Pin-like body 102 extends here parallel relative to handle 101, and pin-like body 103 extends here from handle 101 at an angle of 90°. Pin-like body 102, which extends parallel relative to handle 101, can be used in simple manner to remove coupling element 1 from opening 22 when no coupling element 1 is arranged in an opposite opening situated in the vicinity of opening 22, as shown in FIGS. 11A and 11B. "In the vicinity of" is understood here to mean that the mutual distance between the two openings 22 is smaller than the length of pin-like body 102. Pin-like body 103, which extends at the angle of 90°, is particularly suitable for uncoupling a coupling element 1 or 10 arranged in an opening 22 in the end surface of construction element 30, as shown in FIG. 11C. The length of construction element 30 is such that it is not possible to remove coupling element 1 or 10 with the perpendicular pin-like body 102 by inserting this perpendicular pin-like body 102 via opening 22 into the other end surface of construction element 30. However, by using an opening 22 which extends perpendicularly relative to and in the vicinity of opening 22 in the end surface of construction element 30 the coupling element 1 or 10 can be uncoupled in simple manner using the pin-like body 103 extending at an angle of 90°. Pin-like body 103 can likewise be applied advantageously when an opposite opening situated in the vicinity of opening 22 is provided with a coupling element.

FIGS. 13A-D show a tool 110 for removing coupling element 1 from opening 22 according to a second embodiment of the invention. Tool 110 comprises a body 111 and a pin-like body 112. Tool 110 further comprises a pressing element 113 connected to pin-like body 112 via a connecting rod 114, wherein a spring 115 extends round connecting rod 114 between pressing element 113 and body 111. By exerting a pressing force on pressing element 113 the pin-like body 112 will displace between a first position (FIG. 13A), in which pin-like body 112 extends with a first determined length from body 111, and a second position (FIG. 13B) in which pin-like body 112 extends with a second determined length from body 111, this second determined length being greater than the first determined length. Simultaneously with displacement of pin-like body 112 a flange 116 will displace between a first position (FIG. 13A), in which flange 116 is smaller than the diameter of opening 22 of construction element 60 (see FIGS. 13C and 13D), and a second position (FIG. 13E) in which flange 116 is larger than the diameter of opening 22 of construction element 60. Because flange 116 is larger in the second position than the diameter of opening 22, flange 116 can be pressed against the surface of the construction element while pin-like body 112 presses coupling element 1 out of opening 22. Coupling element 1 can hereby be removed from opening 22 in simple manner.

It is noted that, instead of tools which displace lips 4 inward by exerting a pressing force on tongues 7, it is also possible for a tool to comprise means for displacing lips 4 directly inward, for instance by arranging such means round lips 4 and exerting a pressing force thereon.

FIGS. 14A-14D show a construction element 120 in the form of a wheel, the wheel having an opening 22 in a side surface of the wheel. A mobile toy 121 can be produced in simple manner using such wheel-like construction elements 120, coupling elements 1 and other random construction, coupling and end elements.

Figure 15A:
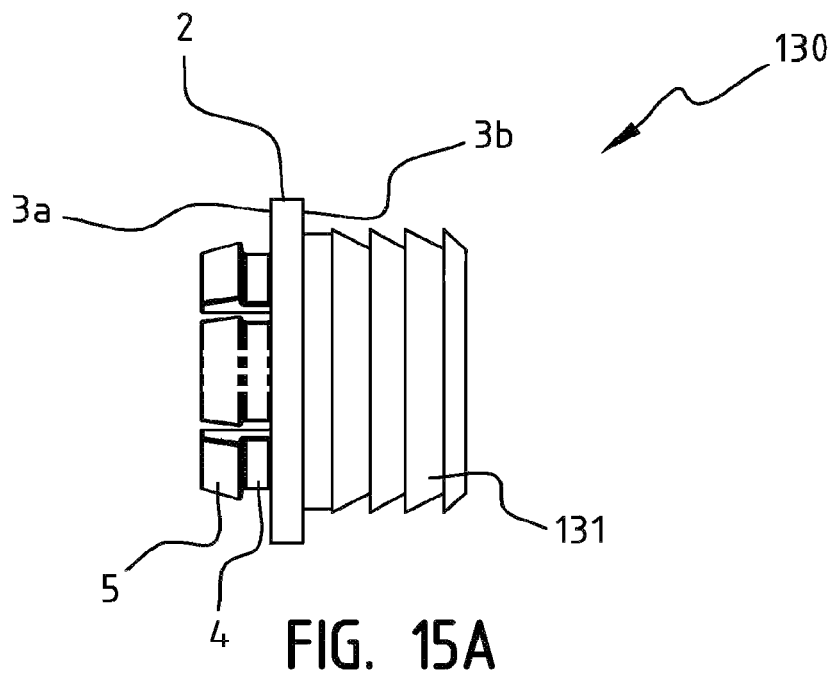
FIGS. 15A, 15B show a side view and perspective view of a coupling element of a modular construction system according to yet another embodiment of the invention.
Figure 15B:
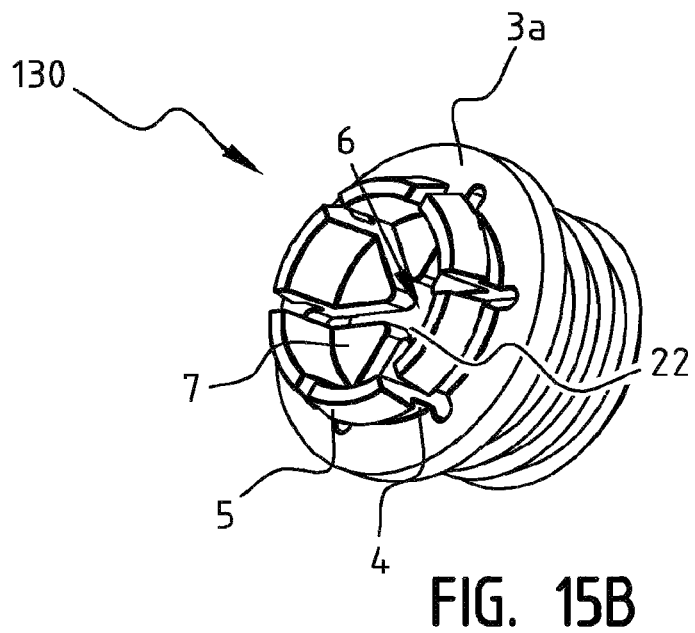

FIGS. 15A, 15B show a coupling element 130 with a round, plate-like body 2 with two mutually parallel flat surfaces 3a, 3b, the surface 3a being provided with a ring of resiliently pivotable lips 4 extending at least substantially perpendicularly of the surface and each provided with a protrusion 5 close to a first end zone. Extending in plate-like body 2 between the two flat surfaces 3a, 3b is an opening 6 which is provided with resiliently pivotable tongues 7 extending radially inward which are connected to lips 4. Surface 3b is provided with other coupling means in the form of a cylinder provided with ribs 131 extending over the cylinder wall, such that hand using coupling element 130 a coupling can be realized between a construction element provided with an opening 22 as shown above on the one hand and a random other construction element on the other.

FIGS. 16A-16C show a shelving system 190. The frame of shelving system 190 is assembled by mutually connecting a number of construction elements 30 using a number of coupling elements 1. Instead of coupling elements 1, coupling elements 11 could alternatively or additionally also used for mutual connection of construction elements 30. Alternatively or additionally, suitable construction elements other than construction elements 30 could optionally also be used. Arranged on the top side of shelving system 190 is a shelf 191 which rests on the upper, horizontally arranged construction elements 30. Arranged at desired intermediate locations are shelves 192 which rest on respective horizontally arranged construction elements 30, these shelves 192 comprising a recess 193 for accommodating the vertically arranged construction elements 30. Shelves 191, 192 can optionally be coupled to construction elements 30, wherein a coupling element 194 is used to connect shelf 191 (or 192) to construction elements 30. Coupling element 194 comprises a hexagonal plate-like body 2 with two mutually parallel, flat surfaces 3a,3b, wherein the one surface 3a is provided with a ring of resiliently pivotable lips 4 extending at least substantially perpendicularly of the surface and each provided with a protrusion 5 close to a first end zone, and wherein the other surface 3b is provided with a cylinder 195 extending perpendicularly of the surface and extending in a respective cylindrical cavity 196 of shelf 191 (or 192). Cylinder 195 of coupling element 194 and cylindrical cavity 196 of shelf 191 (or 192) co-act here as a so-called dowel connection. Using such a coupling element 194 a coupling can on the one hand thus be realized as described above and as will be further described below, and on the other a dowel coupling. It will be apparent that the one side of coupling element 194 is the same as the two sides of coupling element 1.

FIGS. 16A, 16B show that in the connected situation the plate-like body 2 of coupling element 1 extends at least partially inside standing edge 23 of construction element 30.

FIGS. 17A, 17B show a table 140 provided with legs 30 formed by construction elements 30. The table comprises a tabletop 141 provided with coupling elements 142. On their side remote from tabletop 141 the coupling elements 142 are embodied as a coupling element 10, while their side facing toward tabletop 141 comprises no coupling means but is fixedly connected to tabletop 141, for instance by gluing. Tabletop 141 can therefore be seen as an end element with four, in this embodiment round, plate-like bodies 11 with a flat surface 3A provided with a ring of resiliently pivotable lips 4 extending at least substantially perpendicularly of the surface and provided with protrusions 5 close to a first end zone. It is noted that table legs 30 having no openings 22 along their length could also be provided, since only the opening in the uppermost end surface is used for coupling to tabletop 141. Such table legs 30 could take an aesthetic form. It is further noted that, instead of the coupling element 142 fixedly connected to tabletop 141, a coupling element 1, coupling element 10 or a coupling element 94 could also have been used, wherein tabletop 141 could have been provided with respective openings 22 or cylindrical cavities 96.

FIGS. 16A-16C and 17A, 17B show that different types of stands, furniture and the like can be assembled in simple manner using a limited number of construction elements and coupling elements.

It is noted that construction elements and coupling elements of many shapes and dimensions can be envisaged and that the shown examples serve only by way of illustration. Owing to the different shapes, different construction assemblies can be built in simple manner, see for instance FIG. 10. The creativity of a person producing the construction assemblies is hereby stimulated, which can have an educational function. Different construction assemblies in the form of for instance stands and furniture can also be easily assembled. The diameter of the or each ring of lips of a random coupling element and the diameter of the or each opening in a random construction element preferably have standard dimensions in each case such that the assembly of construction assemblies making use of different types of construction and coupling element according to the invention can be simplified through standardization.

It is further noted that the invention is not limited to the above discussed exemplary embodiments but also extends to other variants within the scope of the appended claims.

The invention claimed is:

1. A modular construction system comprising:
   at least two construction elements and a coupling element which can be connected releasably to the construction elements,
   wherein the coupling element comprises a plate-like body with two flat surfaces which are each provided with coupling means, wherein the coupling means of at least one of the two surfaces comprise a ring of resiliently pivotable lips located to one side of the plate-like body and extending at least substantially perpendicularly of the surface, with the lips being provided with locking protrusions close to a first end zone,
   wherein at least one of the two construction elements comprises at least one surface with at least one opening which is adapted to receive the lips of the coupling element in order to connect the coupling element and the construction element, this opening being smaller than the distance between two opposite protrusions of the lips such that in a connected situation the protrusions of the lips of the coupling element engage on the surface of the construction element close to the opening,
   wherein the lips are adapted to displace inward at least close to their first end zones subject to a force exerted on the coupling element such that the distance between the two opposite protrusions of the lips can decrease to less than the size of the opening in the construction element in order to release the connection between the coupling element and the construction element,
   wherein the plate-like body of the coupling element comprises an opening which extends between the two flat surfaces, this opening of the plate-like body being provided with resiliently pivotable tongues extending radially inward from an inner portion of the plate-like body surrounding the opening, the tongues being connected to the lips and extending along the plane of the plate-like body, wherein the tongues of the opening of the plate-like body are displaced out of the plane of the plate-like body at least close to a first outer end of the tongues by a force being exerted thereon to release the connection, such that due to displacement of the tongues out of the plane of the plate-like body the lips are displaced inward,
   said tongues cooperatively presenting a tongue release surface that faces to the one side of the plate-like body, with the tongues being operable to release the connection when the force is applied against the tongue release surface from the one side of the plate-like body.

2. A modular construction system as claimed in claim 1, wherein the surface of the construction element is provided with a standing edge extending around the opening in the surface, wherein in the connected situation the plate-like body of the coupling element extends at least partially inside the standing edge.

3. A modular construction system as claimed in claim 2, wherein the standing edge of the construction element has a polygonal form and includes edge corner points.

4. A modular construction system as claimed in claim 3, wherein the plate-like body of the coupling element has a polygonal form and includes body corner points, wherein in the connected situation, the body corner points of the plate-like body are situated in the edge corner points of the standing edge.

5. A modular construction system as claimed in claim 4, wherein a distance between two opposite body corner points of the plate-like body of the coupling element is greater than a distance between two opposite sides of the standing edge of the construction element, such that a force exceeding a predetermined value is necessary for rotation of the coupling element in the surface of the construction element.

6. A modular construction system as claimed in claim 3, wherein the standing edge of the construction element has interruptions close to its edge corner points.

7. A modular construction system as claimed in claim 2, wherein the standing edge of the construction element has a round form.

8. A modular construction system as claimed in claim 2, wherein the plate-like body has a round form, wherein the diameter of the plate-like body is smaller than a distance between two opposite sides of the standing edge of the construction element, such that rotation of the coupling element in the surface of the construction element can take place freely.

* * * * *